Dec. 26, 1939.  V. VALLETTA  2,184,537
MOTOR VEHICLE COACHWORK
Filed Oct. 27, 1937   2 Sheets-Sheet 1
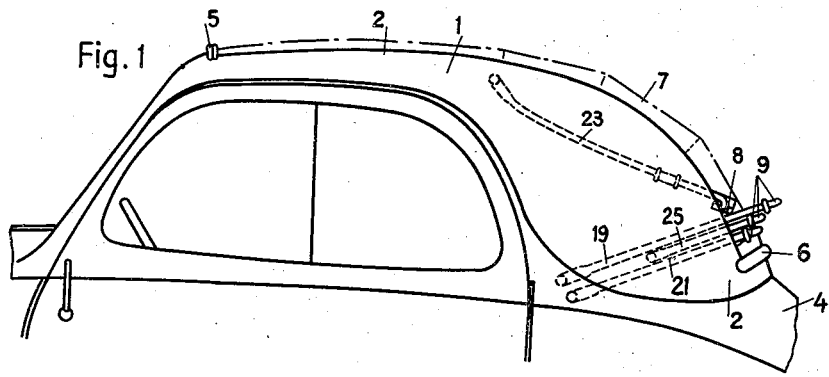
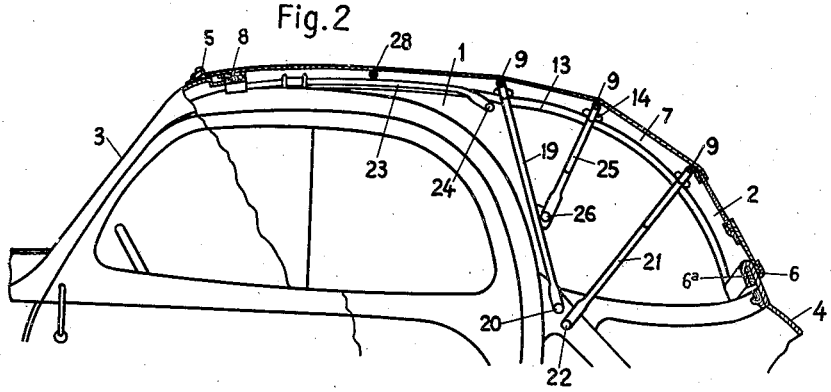
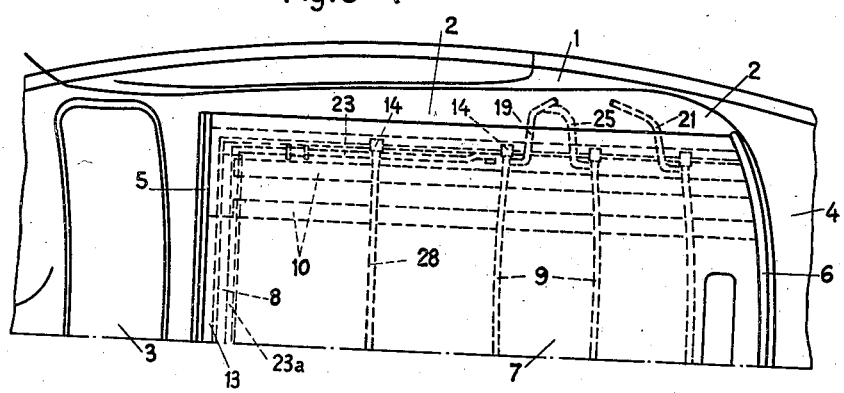
INVENTOR:
VITTORIO VALLETTA
BY Haseltine, Lake & Co.
ATTORNEYS Dec. 26, 1939.   V. VALLETTA   2,184,537
MOTOR VEHICLE COACHWORK
Filed Oct. 27, 1937   2 Sheets-Sheet 2

INVENTOR:
VITTORIO VALLETTA
BY Haseltine, Lake & Co.
ATTORNEYS

Patented Dec. 26, 1939

2,184,537

UNITED STATES PATENT OFFICE 2,184,537

MOTOR VEHICLE COACHWORK

Vittorio Valletta, Turin, Italy, assignor to Fiat Societa Anonima, Turin, Italy

Application October 27, 1937, Serial No. 171,224
In Italy November 3, 1936

3 Claims. (Cl. 296—107)

This invention relates to a closed coachwork with fixed side walls, in which the roof and rear wall of the upper coachwork portion are formed with an opening extending nearly as far as the wind screen, which opening may be closed by a foldable member and uncovered therefrom. In known coachwork of this type the foldable member is made in the form of a so-called sliding roof, that is its side edges run in guides along the stationary roof portions. This arrangement entails a considerable effort in opening and closing the roof, more particularly when the vehicle has been in use for some time, for rain water can penetrate in the guides and form deposits and rust therein.

These and other drawbacks are eliminated according to this invention, by guiding and holding by means of bows the foldable member, which may be of fabric as well as rubber, leather or other flexible material, said bows being journaled to the fixed side walls of the upper coachwork portion, so that the edges of the foldable member freely rest in the closed position on the fixed roof portions. In a preferred form of the invention the bow attached to the front end of the foldable member is articulated approximately at mid-length of the opening and in near proximity to the roof to the side walls, so that in the closed position it is approximately horizontal with its web situated near the front end of the roof opening.

The accompanying drawings show a construction according to this invention by way of example.

Figure 1 is a side view of the upper part of the coachwork, the foldable member being omitted for clearness' sake.

Figure 2 is a longitudinal section of the upper part of the coachwork with the foldable member in closed position.

Figure 3 is a plan vew of Fig. 2.

Figure 4:
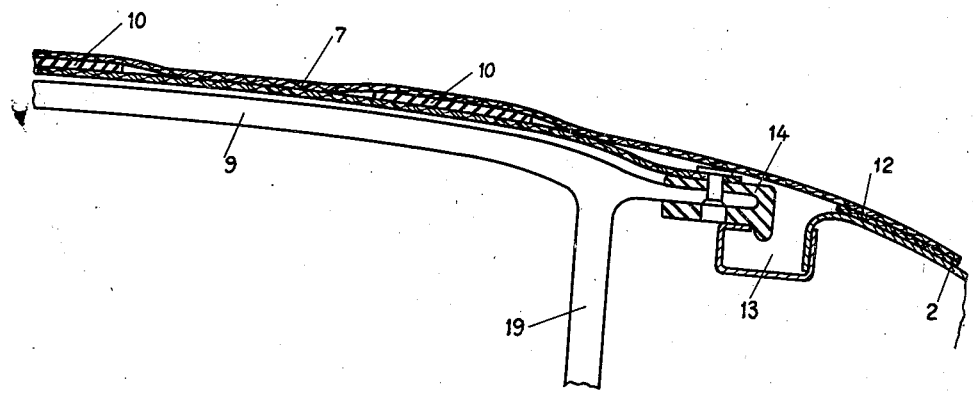
Figure 4 is a cross sectional view of a portion of the roof on an enlarged scale.

The upper part of the illustrated coachwork comprises fixed side walls 1 and the roof 2 sloping towards the rear. A rectangular opening is provided in this roof, which extends from the proximity of the wind-screen 3 as far as the zone of the rear wall 2 where the tail portion of the coachwork begins. A strip 5 of rubber or the like is provided on the roof near the front edge of the opening and a metal strip 6 is provided at the rear edge. The strip 6 has attached thereto by means of an inner wood strip 6a the foldable member constituted by the fabric 7 carrying at its front cross edge a wood bar 8 and a marginal stiffening armature 8a for keeping it stretched in the cross direction and fastening it to the roof in a weather-proof manner as described hereinafter.

The fabric is kept stretched in a cross direction not only by the marginal bar 8 and armature 8a, but also by tubular cross members 9. Longitudinal resilient ties 10 (Figs. 3 and 4) are enclosed in sheaths 11 of the fabric 7. Reinforcing bands 12 run along the side edges of the fabric 7 and freely rest in the closing position of the fabric, on the fixed marginal portions of the roof 2. A channel 13 is provided along the edges of the opening in the roof and serves as eaves for any water penetrating under the edges of the fabric. The inner edge of the two longitudinal channels (Fig. 4) serves also as a rest for the cross members 9 provided for this purpose with rubber studs 14, while the front cross part of the channels 13 (Fig. 5) serves for attaching the fastening mechanisms of the fabric 7.

To insure a water tight seal between the front fabric edge and the roof, the fastening mechanisms are constructed in such manner as to press the edge of the fabric 7 against the rubber strip 5. Each fastening mechanism comprises a pin 16 fixed to the bar 8 and engaging from above an eye formed in the member 15 fixed to the channel 13. The pin 16 is locked in the member 15 against upward movement by the bolt 18 provided with a handle 27 and slidably mounted in the box 26 to which is fixed the pin 16, the spring 17 being protected by the box 26 pressing the bolt to its locking position. The rear walls of the pin 16 and eye are wedge-shaped and the bolt 18 acts upon the lower inclined surface of the member 15 so that, upon closing the mechanisms and by effect of the spring 17 and bolt 18 the pins 16 and thus the whole front edge of the fabric 7 are pulled forwards and the armature 8a is pressed against the rubber strip 5.

The cross members 9 connect as many pairs of arms 19, 21, 25 forming together with them three bow.

The arms 19 and 21 are journaled in the side walls 1 by means of the pivots 20 and 22, respectively, situated near each other behind and below the side windows.

Figure 5:
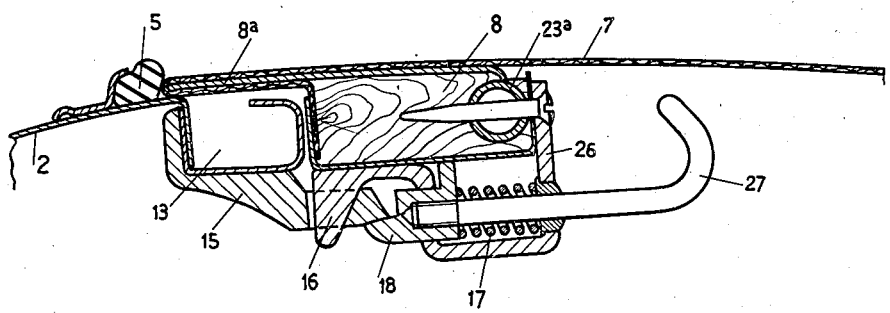
Figure 5 is a sectional enlarged view of the device for fastening the front edge of the foldable member to the roof.

The arms 25 are pivoted by pivots 26 to the arms 19. As shown by Fig. 3, all the arms are suitably curved to suit the contour of the roof and side walls and leave the whole space within the coachwork freely available. The rear portion of the fabric is stretched between these arms 19, 21, 25 and the front portion is kept stretched by a pair of arms 23 journaled by means of pivots 24 about at mid-length of the fabric to the side wall portion situated above the side windows and near the roof, so that in closing position the arms lie approximatively horizontal. The arms 23 are connected to form a bow by the cross member 23a incorporated into the front bar 8 on the fabric 7 (Fig. 5). The fabric is further provided with a cross member 28 which also rests with its rubber studs 14 on the longitudinal edges of the channel 13.

For opening the roof the fastening mechanisms are released and the bow 23, 23a is rocked upwards and towards the rear, this operation being facilitated by the resilient ties 10.

The fabric can be folded in the manner of bellows, uncovering, at will, almost completely the roof opening, as the arms 23 rock over half a turn and the arms 19 and 21 are tilted down on the lower edge of the opening (Fig. 1). The passengers are thus exposed to a satisfactory ventilation with exclusion of draught, and are protected laterally by the glass panels of the side windows and walls. The fabric 7 may be made with a Celluloid window on its portion forming the rear wall.

This convertible coachwork is more particularly suitable for small cars, is easy in operation and cheap in construction.

I wish it to be understood that the invention is not limited to the above described arrangement and modifications can be made without departing from the gist of the invention as claimed.

What I claim is:

1. In a closed coachwork for motor vehicles having in its upper portion fixed side walls and in which the roof and rear wall of the upper portion are provided with an opening extending in near proximity to the windscreen, a foldable flexible member for covering and uncovering said opening, said member freely resting in closing position by its edges on the fixed roof portions, bows articulated to the fixed side walls of the upper coachwork portion and attached to the rear portion of said foldable member for guiding and stretching it, a front bow attached to the foldable member near its front edge, journaled on the side walls approximately at mid length of the opening and arranged to lie approximately horizontal in the closed position, the webs of at least said near bows being prolonged beyond the points of attachment of the bow arms, rubber studs on said prolonged web parts arranged to rest in closed position on the fixed roof parts, and easily detachable means for fastening the front edge of the foldable member to the front edge of said opening.

2. In a closed coachwork for motor vehicles having in its upper portion fixed side walls and in which the roof and rear wall of the upper portion are provided with an opening extending in near proximity to the windscreen, a foldable flexible member for covering and uncovering said opening, said member freely resting in closing position by its edges on the fixed roof portions, a channel fixed on the roof and arranged along the inner edge of the opening for collecting rain water, bows articulated to the fixed side walls of the upper coachwork portion and attached to the foldable member for guiding and stretching it, the webs of said bows being prolonged beyond the points of attachment of the bow arms, resilient studs on said prolonged web portions arranged to rest in closed position on the inner flange of said water collecting channel, and easily detachable means for fastening the front edge of the foldable member to the front edge of said opening.

3. In a closed coachwork for motor vehicles with a windshield, having in its upper portion fixed side walls and in which the roof and rear wall of the upper portion are formed with an opening extending in near proximity to the windshield, a foldable flexible member for covering and uncovering said opening, said member freely resting in closing position by its edges on the fixed roof portions, bows articulated to the fixed side walls of the upper coachwork portion and attached to said foldable member for guiding and stretching the same, webs upon said bows being prolonged beyond the points of attachment of the bow arms, rubber studs on said prolonged web parts arranged to rest in closed position on the fixed roof parts, and easily detachable means for fastening the front edge of the foldable member to the front edge of said opening.

VITTORIO VALLETTA.